United States Patent [19]

Kalfoglou

[11] 4,147,214
[45] Apr. 3, 1979

[54] TANNIN MATERIALS AS ADDITIVES IN OIL RECOVERY PROCESSES INVOLVING CHEMICAL RECOVERY AGENTS

[75] Inventor: George Kalfoglou, Houston, Tex.

[73] Assignee: Texaco Inc., New York, N.Y.

[21] Appl. No.: 859,423

[22] Filed: Dec. 12, 1977

[51] Int. Cl.² ............................................. E21B 43/22
[52] U.S. Cl. ...................................... 166/273; 166/275
[58] Field of Search ............ 166/273, 274, 275, 305 R, 166/252

[56] References Cited

U.S. PATENT DOCUMENTS

| | | | |
|---|---|---|---|
| 3,160,205 | 12/1964 | Harvey et al. | 166/273 |
| 3,384,171 | 5/1968 | Parker | 166/274 |
| 3,437,141 | 4/1969 | Brandner et al. | 166/273 |
| 3,469,630 | 9/1969 | Hurd et al. | 166/273 X |
| 4,005,749 | 2/1977 | Birk et al. | 166/273 |
| 4,006,779 | 2/1977 | Kalfoglou | 166/273 X |
| 4,072,192 | 2/1978 | Kudchadker | 166/273 |

*Primary Examiner*—Stephen J. Novosad
*Attorney, Agent, or Firm*—Carl G. Ries; Thomas H. Whaley; Kenneth R. Priem

[57] ABSTRACT

A process for producing petroleum from subterranean formations is disclosed wherein production from the formation is obtained by driving a fluid from an injection well to a production well. The process involves injecting via the injection well into the formation an aqueous solution of tannin as a sacrificial agent to inhibit the deposition of surfactant and/or polymer on the reservoir matrix. The process may best be carried out by injecting the tannin into the formation through the injection well ahead of or mixed with either a polymer, a surfactant solution and/or a micellar dispersion. This mixture would then be followed by a drive fluid such as water to push the chemicals to the production well.

6 Claims, No Drawings

TANNIN MATERIALS AS ADDITIVES IN OIL RECOVERY PROCESSES INVOLVING CHEMICAL RECOVERY AGENTS

BACKGROUND OF THE INVENTION

1. Field of the Invention

This invention relates to the recovery of oil from subterranean formations by chemical flooding methods.

2. Description of the Prior Art

Petroleum is frequently recovered from subterranean formations or reservoirs by permitting the natural energy of the reservoir to push the petroleum up through wells to the surface of the earth. These processes are referred to as primary recovery methods since they use the natural energy of the reservoir. However, a large amount of oil, generally in the range of 65-90% or more, is left in the subterranean formation at the conclusion of the primary recovery program. When the natural energy is unable to produce more petroleum, it is a common practice to resort to some form of supplemental recovery technique in order to recover additional petroleum left in the subterranean formation. These supplemental operations are normally referred to as secondary recovery operations. If this supplemental recovery operation is the second in a series of such operations, it will be referred to as a tertiary recovery operation. However, the terminology is unimportant for the purposes of this application and relates only to the sequence in which they are carried out.

The most widely used supplemental recovery technique because of its ease of implementation and low capital outlay is water flooding through injection wells drilled into the subterranean formation. In a water flooding operation, the injected fluid displaces oil through the formation to be produced from the injection well. A major disadvantage to water flooding, however, is its relatively poor displacement efficiency largely due to the fact that water and oil are immiscible at reservoir conditions and high interfacial tension exists between the flood water and the oil. For this reason, after a water flood, a large portion of the oil is still left unrecovered in the reservoir.

It has been recognized by those skilled in the art that a solution effecting a reduction in this interfacial tension between water and oil would provide a much more efficient recovery mechanism. Therefore, the inclusion of a surface active agent or surfactant in the flood water was recognized as an acceptable technique for promoting displacement efficiency of the reservoir oil by the water. For example, U.S. Pat. No. 3,468,377 discloses the use of petroleum sulfonates in water flooding operations and U.S. Pat. No. 3,553,130 discloses the use of ethylene oxide adducts of alkyl phenols for the same purpose. The use in water flooding operations of water soluble surface active alkaline earth resistant polyglycol ethers is disclosed in U.S. Pat. No. 2,233,381. Other specialized surfactants, as will be discussed later, have been discovered to have special properties useful in water flooding operations such as a tolerance for high salinity and calcium, and/or magnesium ion concentrations often found in reservoir waters.

However, field operations employing surfactants and surface active agents in injected fluid have not always been entirely satisfactory due to the fact that these materials are often adsorbed by the formation rock to a relatively high degree, resulting in an ever declining concentration of the materials as they progress through the reservoir. Therefore, large concentrations of surface active materials have heretofore been necessary to maintain a sufficient concentration at the oil-water interface. Due to this, many proposed flooding operations involving surface active materials have been uneconomical.

Another serious problem for any recovery technique involving the driving of oil with a fluid is premature breakthrough of the injection fluid. This premature breakthrough indicates that the reservoir has not been adequately swept of oil. The problem is often described in terms of sweep efficiency as distinguished from the displacement efficiency described above. Displacement efficiency involves a microscopic pore by pore efficiency by which water displaces oil, whereas sweep efficiency is related to the growth portion of the reservoir which is swept and unswept by the injected fluid. A major cause of poor sweep efficiency is associated with the fact that the injected fluid generally has a lower viscosity than the displaced fluid (petroleum). Thus, the injected fluid has a higher mobility and tends to finger through the oil, prematurely breaking through to the production well.

One solution to this high mobility problem is to increase the viscosity of the driving fluid. A way to do this is to add polymeric organic materials to a driving water which has the effect of increasing the viscosity of the water, thereby increasing the sweep efficiency of the supplemental recovery process. U.S. Pat. No. 3,039,529 and U.S. Pat. No. 3,282,337 teach the use of aqueous polyacrylamide solutions to increase the viscosity of the injected fluid thereby promoting increased sweep eficiency. Polysaccharides as taught in U.S. Pat. No. 3,581,824 have been used for the same purpose. These polymers are quite expensive and any polymer lost to adsorption on the reservoir matrix adds substantially to the cost since additional polymer is required to maintain a given viscosity.

The above described problems have been recognized by those skilled in the art of oil recovery and certain sacrificial compounds have been added to pretreat the formation in order to decrease the adsorption of subsequently injected surfactants and/or polymers. For example, U.S. Pat. No. 3,414,054 discloses the use of aqueous solutions of pyridine; U.S. Pat. No. 3,469,630 discloses the use of sodium carbonate and inorganic polyphosphates, and U.S. Pat. No. 3,437,141 discloses the use of soluble carbonates, inorganic polyphosphates and sodium borate in combination with saline solution of a surfactant having both a high and a low molecular weight component. These materials have not been completely satisfactory from a standpoint of performance and economics however.

SUMMARY OF THE INVENTION

The invention is a process of producing petroleum from subterranean formations having an injection well and a production well in communication therewith. The process comprises injecting into the formation via the injection well an aqueous solution of tannin either as a preflush and/or in admixture with a chemical oil recovery agent, for example, surfactant, polymer and/or a micellar dispersion. It is the usual practice to then inject a fluid such as water to sweep the chemical components through the reservoir to the production well, thereby displacing oil from the subterranean formation to the surface of the earth.

DESCRIPTION OF THE PREFERRED EMBODIMENTS

A sacrificial material is injected by the process of this invention through an injection means comprising one or more injection wells into a subterranean petroleum-containing formation to preferably occupy or cover all potential adsorption sites of the rock within the subterranean formation thereby reducing the extent of adsorption of the more expensive chemical oil recovery agent injected therewith. A sacrificial agent performs best when it exhibits high adsorption on active sites of rock surfaces, and thus diminishes surfactant and/or polymer adsorption. Chemical compounds of polyelectrolytic nature have the proper physico chemical and structural requirements to behave as successful sacrificial agents. The functional groups on the sacrificial agent molecules enhance adsorption either by hydrogen bonding or electrostatic attraction to active sites on the rock surfaces.

A satisfactory sacrificial material has at least three important characteristics. First, it should be less expensive than the surfactant on a cost effectiveness basis since it is to be sacrificed or adsorbed by the formation, probably not to be recovered. Next, it must be adsorbed readily by the subterranean formation matrix. Preferably the sacrificial material should be adsorbed more readily than the chemical oil recovery agent to be used in the process. The third important characteristic of a sacrificial agent is that the presence of such adsorbed sacrificial material should retard or eliminate adsorption of the surfactant and/or polymer chemical recovery material on the adsorption sites of the formation rock. By adsorption sites of the formation rock it is meant those parts of the surfaces of the pores of the formation rock capable of adsorbing a chemical compound from a solution on contact.

The sacrificial material may not have a detrimental effect on the recovery efficiency of the chemical flooding operation. Additional oil is usually recovered only if the sacrificial material is followed by or is admixed with a surfactant and/or a polymer chemical recovery agent which will effectively increase the amount of oil displaced from the subterranean formation. When the surfactant is chosen as the chemical recovery agent it should be injected in admixture with the sacrificial agent for best results and ahead of the following flooding water thereby achieving the desired interfacial tension reduction between the injected fluid and the displaced fluid with minimal loss of surfactant on the formation matrix. The surfactant may be present in a hydrocarbon solvent or in an aqueous solution or in a combination thereof. Any anionic, nonionic and/or cationic type of surfactant known in the art may be used in the practice of this invention. Some types of surfactants were mentioned previously. In addition, surfactants disclosed and claimed in the following U.S. patents, for example, are particularly useful since they have been found to be capable of performing in reservoirs having both high salinities and high hardness levels: U.S. Pat. Nos. 3,858,656; 3,811,505; 3,811,504 and 3,811,507.

Likewise, the amount of surfactant which must be employed in the practice of any chemical flood is generally known in the art and is to be found in published literature. However, the slug size of surfactant generally will range from about 0.01 to 1 pore volumes of an aqueous surfactant solution having dissolved therein from about 0.1 to about 10.0 percent by weight of the surfactant itself.

In my invention the sacrificial agent may be injected ahead of or in admixture with the surfactant slug into the petroleum formation. A surfactant/sacrificial agent mixture may also be preceded by a slug of sacrificial material in aqueous solution.

In any of these embodiments and others which are obvious to those skilled in the art, the surfactant containing slug may be followed by a material to taper the viscosity before drive water is injected. This technique known well to those skilled in the art prevents the water from fingering into the more viscous surfactant containing slug.

Natural vegetable tannins are obtained from trees, leaves, wood, fruits and roots. The tannins are water-soluble, complex organic compounds. All tannin extracts contain mixtures of polyphenolic substances, and some have associated with them certain sugars. Synthetic tanning materials (syntans) are manufactured materials that are used as partial or complete replacements for natural vegetable tanning extracts. Most syntans are condensation products of formaldehyde and naphthalene sulfonic acids, various phenols and sulfonated phenols, diaryl sulfones, urea, melamine and diamide. Some syntans are produced by combining polyphenolic materials with lignosulfonates. The most common of these materials employs a formaldehyde or a furfural condensation product of resorcinol as the phenolic syntan.

Vegetable Tanning Materials

As mentioned, natural vegetable tannin materials are widely distributed in nature. Major sources of tannin materials are: quebracho, chestnut wood, wattle bark and hemlock bark.

The actual chemistry of vegetable tannin materials is not well understood and therefore, naturally occuring tannins are often referred to as vegetable tanning extracts. There are two main classes of natural vegetable tanning extracts: (1) hydrolyzable extracts and (2) condensed tanning extracts.

Hydrolyzable Extracts

These materials are divided into two main groups, gallic acid and ellagic acid. The chemical formulas for these materials are given below:

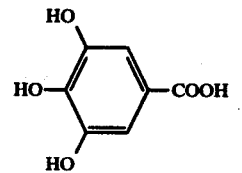

Gallic Acid

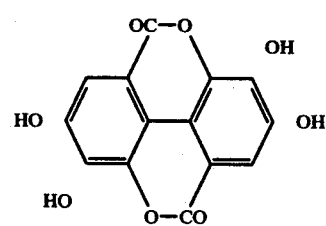

Ellagic Acid

These materials and combinations of these types of materials are representative of the hydrolyzable tannin extracts found in nature.

Condensed Tanning Extracts

Condensed tanning extracts are found principally in the roots, bark and wood of plants. For example, in the quebracho and wattle trees. The following structure is assumed by most of those skilled in the art to be the principal structural skeleton of this type of tannin molecule. It is called the flavan structure.

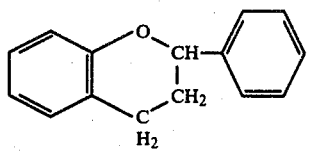

Synthetic Tanning Materials

The principal syntans are condensation products of formaldehyde and various other materials including naphthalenesulfonic acids, various phenols and sulfonated phenols, diaryl sulfones, urea, melamine, and dicyandiamide. Other syntans are produced without formaldehyde using materials such as lignosulfonates. The two most common categories of syntans are naphthalenic syntans and aromatic hydroxy syntans. The principal structures of these two types of materials are given below.

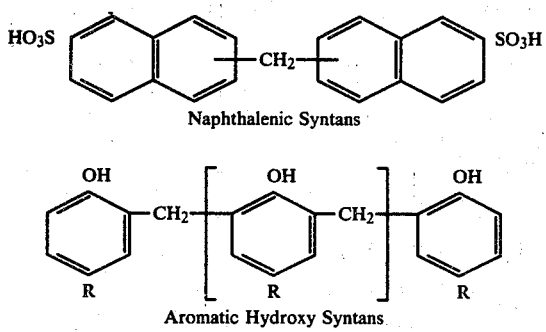

Aromatic hydroxy syntans may be made by two general methods. The first method sulfonates an aromatic hydroxy compound and then condenses this product with formaldehyde. The second method condenses an aromatic hydroxy compound with formaldehyde and then sulfonates the resulting product until it is water soluble. Aromatic hydroxy syntans may be made into less expensive materials by combining then with lignin sulfonates.

A complete discussion of synthetic and natural tannin materials may be found in Kirk-Othmer Encyclopedia of Chemical Technology, 2d Edition, under the subject heading, Leather.

Tannins may be chemically modified to obtain products with improved properties, such as higher tolerance to salinity and hardness and increased adsorption to rock surfaces. Several modification reactions employed are sulfomethylation, carboxylation, oxidation, ethoxylation and formaldehyde condensation.

Commercially available syntans are sold under the tradenames Lomar D, Lomar LS, Lomar PW, Blancol, Monotan R, Nopcotan A-6-S-D, Neradol D, Neradol N, Leukanol and others.

Tannins (natural vegetable tannins or synthetic tanning materials) are suggested to be utilized as a preflush slug followed by a surfactant slug, in order to adsorb on rock surfaces and satisfy the adsorption sites and thus minimize surfactant adsorption. It is also suggested to use these tannins as sacrificial agents in admixture with surfactant systems. In certain applications admixtures of sacrificial agents and surfactant systems prove to be more effective in improving oil recovery. Following the injection of the surfactant system, with or without sacrificial agent, the suitable drive fluid (e.g. water, higher viscosity water—thickened with polymers) may contain tannins which will aid in the desorption of surfactant, by adsorbing on those sites previously occupied by the surfactant molecules. This will increase surfactant concentration in the flood water, and thus contribute to displacing additional oil. If polymeric solutions are used as a portion of the drive fluid, the sacrificial agent (tannin) will in turn decrease the adsorption of the polymer on the rock matrix. This will have a beneficial effect in maintaining the proper mobility ratio between the surfactant slug and displaced fluid, and thus achieve high sweep efficiency and vertical conformance. The combination of extended displacement efficiency and sweep efficiency contributes to high oil recovery in enhanced oil recovery processes.

The quantity of tannin to be injected into the subterranean hydrocarbon formation may be any amount up to and including an amount sufficient to occupy substantially all of the active sites of the formation matrix. If less than the maximum amount is used, there will be a corresponding increase in the adsorption of surfactant from injection solution onto the formation matrix although the amount of increase will not be as great as in the case where the formation is completely free of tannin. At a maximum, only the amount of tannin needed to completely occupy the active sites on the formation matrix is needed. To be effective, the amount used should reduce the adsorption of surfactant on the reservoir matrix. The detriment resulting from using excess tannin would be an increase in the cost of operating the oil recovery program.

The amount of tannin needed in the process of the invention depends on the particular formation, the area of pattern to be swept and other formation characteristics. Those skilled in the art can determine the exact quantity needed to afford the desired amount of protection.

Generally it has been found that the amount of tannin will be effective in amounts of from 0.01 to 1.0 pore volumes of the aqueous solution of surfactant-sacrificial agent or only sacrificial agent solution.

The effectiveness of this invention for reducing the adsorption of surfactant or polymer on the formation rock and chemical flooding operations is demonstrated by the following examples which are presented by way of illustration and are not intended as limiting the spirit and scope of the invention as defined in the claims.

EXAMPLE I

The performance of tannins as sacrificial agents was evaluated by testing LOMAR LS* in a surfactant flood and determining its effect on the tertiary oil recovery efficiency of the surfactant system. Surfactant floods were performed using the surfactant-solubilizer system: 0.54% TRS 18+1.22% TRS 40+0.74% Adduct N-60

CS**. A base run was performed by surfactant flooding a waterflooded limestone core at 109° F. which was initially saturated with Slaughter formation water and Slaughter crude oil. An amount of 0.4 PV of 2.5% surfactant solution prepared in Slaughter formation water was injected, and then was followed by 1000 ppm Xanflood (polysaccharide) polymer solution prepared in fresh water. The oil recovery efficiency of the base run was 58.9%. A similar surfactant flood was performed in the same core after the core was cleaned and resaturated with Slaughter formation water and crude oil. The flooding conditions were kept exactly the same as those for the base run, except for the fact that 2% Lomar LS was incorporated into the surfactant system. An amount of 0.4 PV of 2.5% (TRS 18/40-Adduct N-60 CS) +2% Lomar LS prepared in Slaughter formation water was injected, and then was followed by 1000 ppm Xanflood polymer solution prepared in fresh water. The oil recovery efficiency of the second run was 84.6%.

*Lomar LS is believed to have a structure similar to:

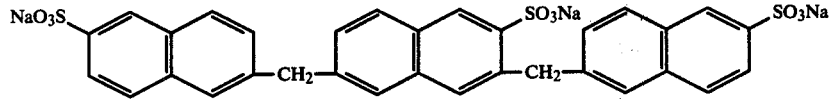

**TRS-18:petroleum sulfonate, TRS-40:petroleum sulfonate, Adduct N-60CS:chain sulfonated 6 mole ethylene oxide adduct of nonyl phenol.

In the core floods performed, Lomar LS substantially increased the tertiary oil recovery efficiency (from 58.9% to 84.6%) of the petroleum sulfonate-solubilizer surfactant system employed. It is, thus, concluded that tanning materials can be effectively used as sacrificial agents in surfactant floods.

EXAMPLE II

Lomar D, Lomar PW, Lomar LS, Lomar ST and others are synthetic tanning agents (manufactured by Diamond Shamrock) which have high salinity and hard water tolerance, and exhibit no adverse interaction with surfactant. These polyelectrolytes have chemical structures which make them suitable candidates for sacrificial agents on carbonate surfaces. Both Lomar PW ($Na_2SO_4$:6%) and Lomar LS ($Na_2SO_4$:1%) were tested to determine their effect on adsorption of petroleum sulfonate-solubilizer system (TRS 18/40-Adduct N 60 CS) on Slaughter (carbonate) core material. 77 Kg/m³ (7.7%, w/v) TDS brine was used. Slaughter core material was crushed, cleaned and sieved. The fraction that passed a 200 mesh size sieve was used as adsorbent in adsorption tests. Shake bottle tests were conducted by contacting 20 g of crushed Slaughter core material with 50 cc surfactant solution for 24 hours at 43° C. (109° F.). Adsorption values of 2.5% (1%) Slaughter 2 surfactant system with/without sacrificial agent present are tabulated below:

| | mg Surfactant Adsorbed | |
|---|---|---|
| Sacrificial Agent | g Crushed Slaughter | Core Material |
| No sacrificial agent | 2.9 | (2.8) |
| 0.5% Lomar PW | 0.22 | (0.3) |
| 1.0% Lomar PW | 0.15 | (0.05) |
| 2.0% Lomar PW | 0.1 | |
| 0.5% Lomar LS | 0.6 | |
| 1.0% Lomar LS | 0.25 | |
| 2.0% Lomar LS | 0.2 | |

Results indicate that both Lomar PW and Lomar LS are very effective in reducing surfactant adsorption on crushed Slaughter core material.

I claim:

1. In a method for recovering oil from a subterranean formation containing oil and having an injection well and a production well wherein a surfactant solution is injected into the injection well in order to drive the oil to the production well wherein it is produced the improvement which comprises:

injecting into the injection well in admixture with the surfactant a synthetic tanning material in amounts effective for reducing the adsorption of surfactant on the reservoir matrix.

2. A method as in claim 1 wherein the synthetic tanning materials are present in amount sufficient to occupy substantially all of the active sites on the formation matrix.

3. A method for recovering oil from a subterranean formation containing oil and having an injection well and a production well wherein flooding water is injected into the subterranean formation comprising:
(a) injecting through the injection well into the formation an aqueous solution of a synthetic tanning material,
(b) subsequently injecting into the formation via the injection well a surfactant solution also containing a synthetic tanning material, and
(c) producing oil from the formation via the production well.

4. A method as in claim 3 wherein the solution in step (b) is followed by flooding water.

5. A method for recovering oil from a subterranean formation containing oil and having an injection well and a production well wherein flooding water is injected into the subterranean formation comprising:
(a) injecting through the injection well into the formation an aqueous solution of a synthetic tanning material,
(b) subsequently injecting into the formation via the injection well a surfactant solution, and
(c) producing oil from the formation via the production well.

6. A method as in claim 5 wherein the solution in step (b) is followed by flooding water.

* * * * *